United States Patent
Raheja et al.

(10) Patent No.: US 10,339,039 B2
(45) Date of Patent: Jul. 2, 2019

(54) VIRTUAL SERVICE INTERFACE

(71) Applicant: CA, Inc., Islandia, NY (US)

(72) Inventors: Rajesh M. Raheja, Cupertino, CA (US); Dhruv Mevada, Fremont, CA (US); Siddharth Sharma, Austin, TX (US); Stephy Nancy Francis Xavier, Santa Clara, CA (US)

(73) Assignee: CA, Inc., Islandia, NY (US)

( * ) Notice: Subject to any disclaimer, the term of this patent is extended or adjusted under 35 U.S.C. 154(b) by 156 days.

(21) Appl. No.: 15/415,605

(22) Filed: Jan. 25, 2017

(65) Prior Publication Data

US 2018/0210745 A1    Jul. 26, 2018

(51) Int. Cl.
*G06F 9/46* (2006.01)
*G06F 11/36* (2006.01)

(52) U.S. Cl.
CPC .......... *G06F 11/3688* (2013.01); *G06F 9/466* (2013.01)

(58) Field of Classification Search
CPC .............................. G06F 9/466; G06F 11/3688
See application file for complete search history.

(56) References Cited

U.S. PATENT DOCUMENTS

| | | | |
|---|---|---|---|
| 6,182,282 B1 * | 1/2001 | Stoodley | G06F 9/449 717/116 |
| 8,112,262 B1 | 2/2012 | Michelsen | |
| 8,146,057 B1 | 3/2012 | Michelsen | |
| 9,323,645 B2 | 4/2016 | Michelsen | |
| 9,563,546 B2 | 2/2017 | Michelsen | |
| 9,756,072 B2 * | 9/2017 | Kumar | H04W 12/12 |
| 2015/0205699 A1 | 7/2015 | Michelsen | |
| 2015/0205700 A1 | 7/2015 | Michelsen | |
| 2015/0205701 A1 | 7/2015 | Michelsen | |
| 2015/0205702 A1 | 7/2015 | Michelsen | |
| 2015/0205703 A1 | 7/2015 | Michelsen | |
| 2015/0205708 A1 | 7/2015 | Michelsen | |
| 2015/0205712 A1 | 7/2015 | Michelsen | |
| 2015/0205713 A1 | 7/2015 | Michelsen | |
| 2015/0220423 A1 * | 8/2015 | Kraus | G06F 11/3684 717/135 |
| 2015/0286560 A1 | 10/2015 | Michelsen | |

* cited by examiner

*Primary Examiner* — Camquy Truong
(74) *Attorney, Agent, or Firm* — Alliance IP, LLC

(57) ABSTRACT

A virtualization request is identified to initiate a virtualized transaction involving a first software component and a virtual service simulating a second software component. A reference within the first software component to the second software component is determined, using a plugin installed on the first software component, that is to be used by the first software component to determine a first network location of the second software component. A second network location of a system to host the virtual service is determined and the reference is changed, using the plugin, to direct communications of the first software component to the second network location instead of the first network location responsive to the virtualization request.

19 Claims, 8 Drawing Sheets

| | | | SERVICE MODEL 300 |
|---|---|---|---|
| TRANSACTION 301(A) → COMMAND 311 | OBSERVED ATTRIBUTE(S) 321(1) | OBSERVED CHARACTERISTIC(S) 331(1) | OBSERVED RESPONSE 341(1) |
| TRANSACTION 301(B) → COMMAND 311 | OBSERVED ATTRIBUTE(S) 321(2) | OBSERVED CHARACTERISTIC(S) 331(2) | OBSERVED RESPONSE 341(2) |
| ⋯ | ⋯ | ⋯ | ⋯ |
| TRANSACTION 301(n+1) → COMMAND 311 | UNKNOWN ATTRIBUTE(S) 321(n+1) | DEFAULT CHARACTERISTIC(S) 331(n+1) | DEFAULT RESPONSE 341(n+1) |
| TRANSACTION 302(A) → COMMAND 312 | OBSERVED ATTRIBUTE(S) 322(1) | OBSERVED CHARACTERISTIC(S) 332(1) | OBSERVED RESPONSE 342(1) |
| TRANSACTION 302(B) → COMMAND 312 | USER-SPECIFIED ATTRIBUTE(S) 322(2) | USER-SPECIFIED CHARACTERISTIC(S) 332(2) | USER-SPECIFIED RESPONSE 342(2) |
| ⋯ | ⋯ | ⋯ | ⋯ |
| TRANSACTION 302(m+1) → COMMAND 312 | UNKNOWN ATTRIBUTE(S) 322(m+1) | DEFAULT CHARACTERISTIC(S) 332(m+1) | DEFAULT RESPONSE 342(m+1) |
| TRANSACTION 303 → UNKNOWN COMMAND 313 | UNKNOWN ATTRIBUTE(S) 323 | DEFAULT CHARACTERISTIC(S) 333 | DEFAULT RESPONSE 343 |

FIG. 3

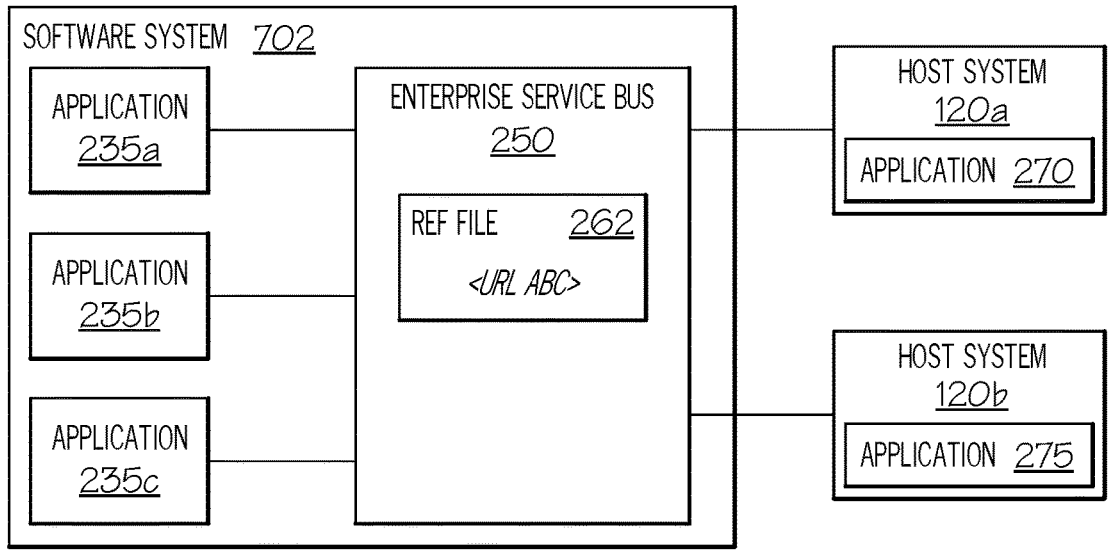
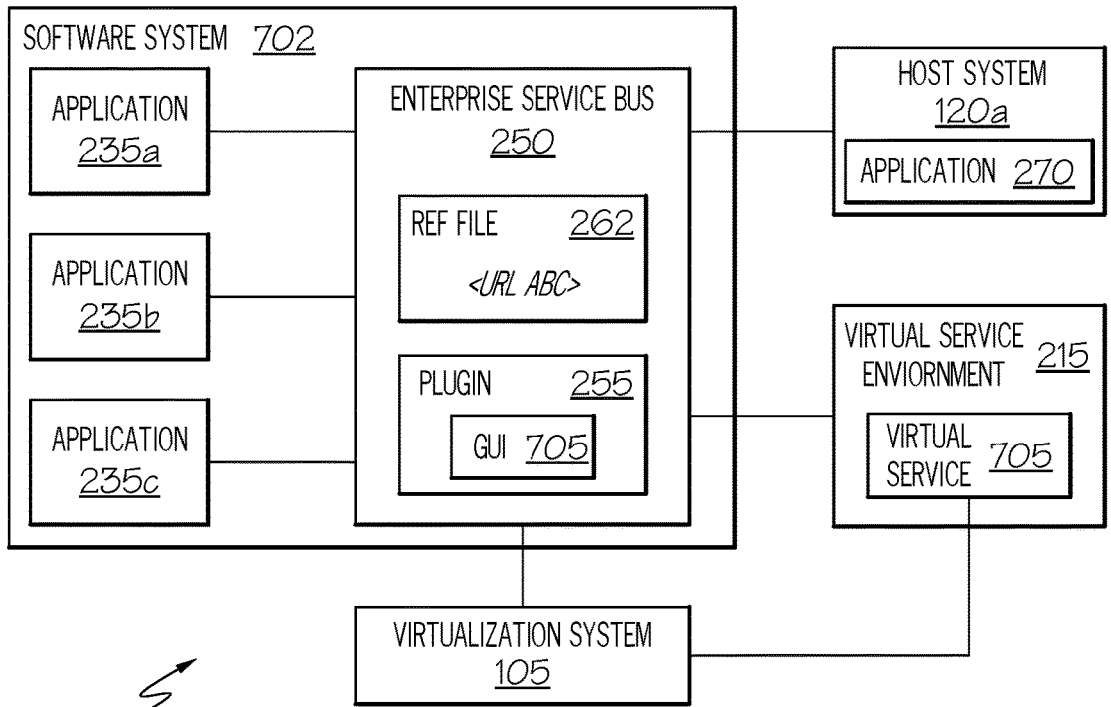

VIRTUAL SERVICE INTERFACE

BACKGROUND

The present disclosure relates in general to the field of computer development, and more specifically, to software development involving coordination of mutually-dependent constrained systems.

Modern software systems often include multiple programs or applications working together to accomplish a task or deliver a result. For instance, a first program can provide a front end with graphical user interfaces with which a user is to interact. The first program can consume services of a second program, including resources of one or more databases, or other programs or data structures. In some cases, multiple interoperating computer programs and resources can be controlled or developed by a single entity, such as a single enterprise, publisher, or developer. In other instances, interoperating programs and resources can be developed and controlled by different parties. In some cases, access to a system component can be constrained in connection with the testing or development of the program (or its constituent components) that are to interoperate with the other components, for instance, when the component is a live production database and cannot be conveniently brought offline, is owned or controlled by a third party, or is, itself, under development.

BRIEF SUMMARY

According to one aspect of the present disclosure, a virtualization request can be identified that requests the initiation of a virtualized transaction involving a first software component and a virtual service simulating a second software component. A reference within the first software component to the second software component can be determined that is to be used by the first software component to determine a first network location of the second software component and communicate with the second software component based on the first network location. A second network location of a system to host the virtual service may be determined based on the virtualization request and the reference may be changed, using a plug-in installed on the first software component, to direct communications of the first software component to the second network location instead of the first network location responsive to the virtualization request. The virtualized transaction may include a request sent from the first software component to the virtual service and a synthetic response generated by the virtual service to model a real response by the second software component to the request.

BRIEF DESCRIPTION OF THE DRAWINGS

FIG. 3 is a simplified block diagram illustrating an example service model in accordance with at least one embodiment;

FIGS. 7A-7D are simplified block diagrams illustrating the use of a plugin in a middleware component in association with a virtualized transaction in accordance with at least one embodiment;

Like reference numbers and designations in the various drawings indicate like elements.

DETAILED DESCRIPTION

Figure 1:
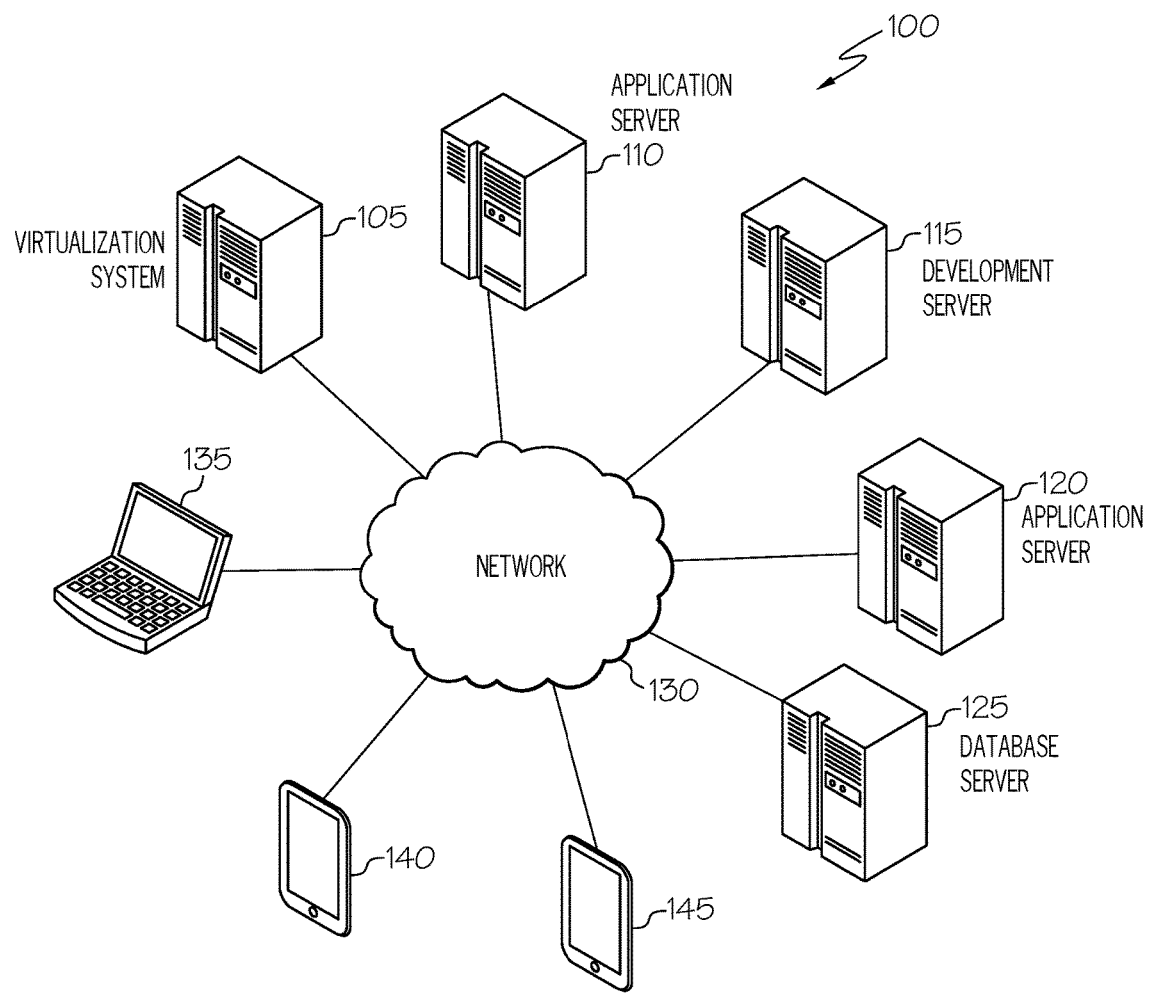
FIG. 1 is a simplified schematic diagram of an example computing system including an example virtualization system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, a simplified block diagram is shown illustrating an example computing environment 100 including a virtualization system 105, one or more application servers (e.g., 110, 120, 125) (e.g., including web servers, application servers, database systems, mainframe systems and other examples), and a development system 115. Software components developed and/or tested using testing, quality assurance, and development tools hosted by one or more development systems (e.g., 115) may utilize virtual services provided through virtualization system 105. Software components (e.g., hosted on application server 110 or development system 115 (e.g., an application under development)) may interact with a virtual service that models one or more applications, services, or other software components hosted by another system (e.g., 120, 125). Such virtual services may be hosted on a virtualization system or another system (e.g., provisioned by the virtualization system 105) that hosts at least a portion of the code used to implement the virtual service. In some cases, software component, which are to interface with a virtual service, may be instrumented with a plugin to simplify the rerouting of traffic intended for a real-world software component (e.g., hosted by application server 120) to a virtualized version of the software component implemented in a virtual service hosted on another system.

A virtual service can be launched based on the virtual service model. A virtual service can operate to stand-in for a modeled software component by simulating the modeled component's responses to requests and other messages received from other components (e.g., components dependent on the modeled component). The modeled, or virtualized, component synthesized through a corresponding virtual service can be used in place of the real world component, for instance, when the component or system hosting the component is offline, permits limited access (e.g., is managed or owned by a third party), is under development or repair, or is otherwise unavailable, allowing software components dependent on the virtualized component to still be executed, tested, developed, etc. against the simulations provided by the virtualized component.

As noted above, virtual service models can be based on monitoring of transactions between components, including transactions between applications, services, databases, and other components. A transaction can include one or more requests and corresponding responses to the requests. In some instances, a transaction can be composed of multiple transaction fragment, each fragment corresponding to a request and the corresponding response between two particular components of the system. Transaction data can describe the requests and corresponding responses. Such transaction data can be based on recorded instances of the transactions. Such instances can be monitored and recorded and include recorded real world transaction instances as well as recorded test or non-production transaction instances involving the component(s) to be modeled. Alternatively, transaction data can be user-defined or otherwise derived to describe desired, idealized, predicted, or hypothetical responses of a particular component to various types of requests in various types of transactions. In some instances, such transaction data can be derived by identifying expected behavior of a particular component from specification data, log files, Web Services Description Language (WSDL) or Web Application Description Language (WADL) descriptions, or other structured or unstructured data describing the component's responses to various types of requests and other functionality and behavior of the component in transactions of particular types. Regardless of how the transaction data is generated, the transaction data can be processed to identify patterns and behaviors relating to how one component responds to particular messages or requests received from other components. Transaction data can describe requests and corresponding responses, together with attributes of the respective requests and responses. In some cases, requests and responses can be transmitted between components over one or more networks (e.g., 130), among other examples.

Computing environment 100 can further include one or more user computing devices 135, 140, 145 that can be used to allow users to interface with and consume resources of virtualization system 105, application servers 110, 120, development system 115, etc. For instance, users can utilize computing devices 135, 140, 145 to automatically launch a virtual service based on transaction data in one or more data sources (e.g., hosted by one or more transaction data sources). In some implementations, a plugin may be provided in applications within a system and user computing devices 135, 140, 145 may be utilized to interface with the application and the plugin. For instance, users may use a user device (e.g., 135, 140, 145) to enter a virtualization request to cause transactions of a corresponding application to be automatically rerouted to a virtual service simulated one or more software components upon which the application is dependent, among other examples.

User computing devices 135, 140, 145 can also be used to define or generate transaction data for use in generating corresponding virtual service models. Users, such as administrator or developer users, can further utilize user computing devices 135, 140, 145 to instrument software components (e.g., with agents for monitoring of transactions), manage recording of transactions between applications and databases, administer the generation of corresponding virtual service models and virtual services (e.g., using plugins), edit virtual service models, and perform other tasks in connection with the generation, maintenance, and use of virtual service models. In some cases such virtual services can be used in connection with the development and testing of an application, portion of an application, or other component that is dependent on one or more other components, such as a web service, mainframe system, database, etc. For instance, a development system (e.g., 125) can host a testing system to test performance of one or more components of a system, and user computing devices 135, 140, 145 can be utilized by a test administrator to access testing services of the development system 125 and conduct tests of these components, among other potential uses.

In general, "servers," "clients," "computing devices," "network elements," "database systems," "user devices," and "systems," etc. (e.g., 105, 110, 115, 120, 125, 135, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 120, 125, 135, 140, 145, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a virtualization system 105, data source server 110, application server 115, 120, or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, sub-system, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Virtual services represent a significant advancement over early technologies utilizing conventional mocking and stubbing implementations to provide a stand-in for an available component. Virtual services can more accurately synthesize a virtualized component's role in transactions with other component and can enable smarter, more life-like synthesized responses such as responses dynamically generated to account for request-sensitive values and time sensitive values, stateless and stateful responses, responses in transaction conversations, sessions, and correlated transaction contexts, responses simulating performance of the virtualized component (e.g., responsive to an assumed processor or memory load, bandwidth or other network restrictions/availability, etc.), among other examples.

In some cases, during testing (or development), a tester (user or system) may perform various tests, such as load testing, integration testing, and other tests for an application. The application may be configured to interface with other software components upon which it depends. To facilitate such interaction with these other software components, the application may be configured with outbound uniform resource locators (URL) or other address information that the application may refer to and use to communicate with the system(s) hosting the other software components. Accordingly, in order to prepare the application to interface with virtual services modeling the other software components, these outbound references may first need to be modified to redirect the requests of the application to the system hosting the virtual service(s) instead of the other software component(s). In traditional implementations, this may be done manually by a user, with the user locating the reference (or identifying a location of the reference) and providing a substitute reference corresponding to the virtual service.

In many cases, outbound address references included in an application may be application dependent. Further, in some software systems, an application may communicate with external services over middleware applications, such as Enterprise Service Bus (ESB) applications. Accordingly, the middleware may be the application which interfaces directly with the other software component to be simulated using a virtual service. Additionally, a software system may include a variety of applications and middleware programs, each implementing outbound references in a specific way. Accordingly, a user-tester tasked with preparing any one of these varied applications for interaction with one or more different virtual services may be challenged by the diversity of different ways in which these applications handle and implement outbound communications with other software components and any corresponding virtual services developed to stand-in for these other software components. However, such users may not possess the level of expertise to identify and modify outbound references of any one of potentially multiple different applications, among other example issues.

Figure 2:
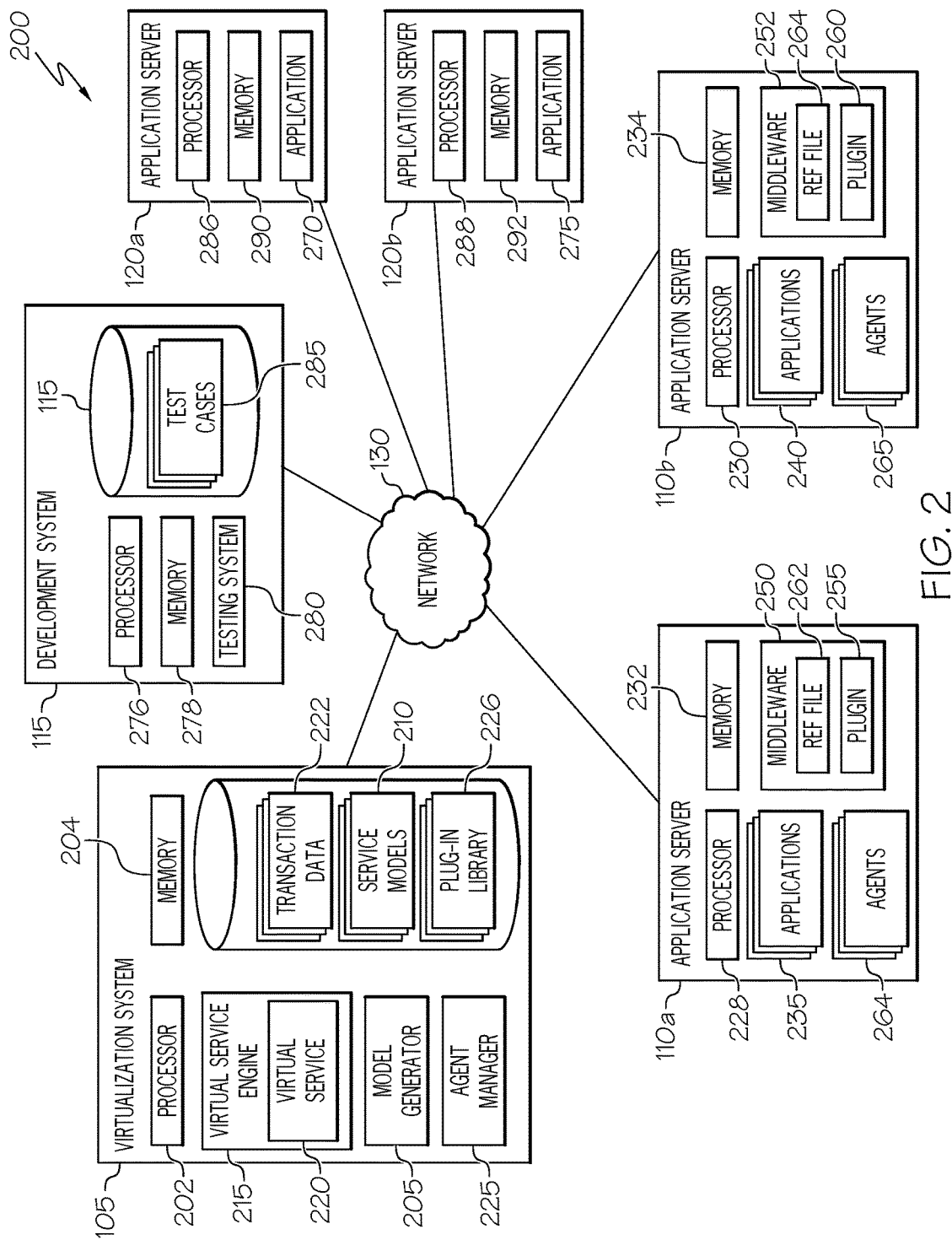
FIG. 2 is a simplified block diagram of an example computing system including an example virtualization system with associated software component plugins in accordance with at least one embodiment.

At least some of the systems described in the present disclosure, such as the systems of FIGS. 1 and 2, can include functionality to at least partially address at least some of the above-discussed issues, as well as others not explicitly described. For instance, in the example of FIG. 2, a simplified block diagram 200 is shown illustrating an example environment including an implementation of a virtualization system 105 that includes a model generator 205 adapted to assist in the generation of service models (e.g., 210) that can be used by virtual service engine 215 to deploy virtual services (e.g., 220) to simulate behavior of one or more modeled components in transactions with at least one other software component.

A virtualization system 105 can include one or more data processing apparatus (e.g., 202) and one or more memory elements 204 for use in implementing executable modules, such as model generator 205, virtual service engine 215, agent manager 225, etc. As noted above, model generator 205 can generate service models 210 from transaction data 222 describing requests and responses included in various transactions of various types involving applications, services, programs, modules, and other software components of a system. Transaction data 222 can be generated from monitoring of a live or other non-simulated version of a software component. Transaction data 222 can be supplemented with user- or manually-generated transaction data describing hypothetical request-response pairs or request-response pairs otherwise not observed during monitoring of software components of a system. Transaction data 222 can be generated, for instance, by the tools used to monitor the system. For instance, agents (e.g., 264, 265) instrumented on one or more software components (e.g., 235, 240) can monitor not only the request and responses entering/leaving a software component, but can also identify functionality and conditions internal to a software component (e.g., 235, 240) as request and responses are being generated or processed during a transaction (or particular transaction fragment). Other tools, can monitor communications between components over ports or networks (e.g., 130) and describe characteristics of the requests and response as observed "on the wire" between components (e.g., between an application (e.g., 140) hosted on a first application server (e.g., 110a) and another application (e.g., 270) hosted on another application server (e.g., 120a)), among other tools which may be used to monitor transactions between software components and generate transaction data 222 describing attributes of the transactions.

An example agent manager 250 can interface with various recording tools (e.g., 264, 265) that monitor request and response communications between components engaged in transactions. An agent manager 250, in some implementations, may also obtain transaction data from a variety of other sources. In some instances, a single service model 210 can be generated from transaction data from multiple different sources/tools and/or of multiple different types. A model generator 205 can identify transaction data 222 corresponding to a particular software component and utilize the identified transaction data to generate one or more service models 210 for the particular software component.

In some implementations, a virtualization system 105 may provide plugins (e.g., from a plugin library) to any one of a variety of different applications or middleware. The plugins may be adapted to interoperate with components of the virtualization system, such as the virtual service engine 215 and model generator 205. The plugins (e.g., 255, 260) may be accessed from plugin library 226 and may be incorporated in or otherwise provided to interoperate with an application (e.g., 235, 240) of a corresponding type. In some implementations, the plugin may provide an API to the virtualization system 105 from the application in which it is installed or with which it otherwise interoperates. A plugin (e.g., 255, 260) may be specifically configured for use in connection with a respective type of application (e.g., 235, 240) and include logic to identify the location in the corresponding application of an outbound reference utilized by the application (e.g., 235, 240) to identify the location of address information for one or more other applications (e.g., 270, 275) with which the application (e.g., 235, 240) is to communicate. The plugin (e.g., 255, 260) may additionally be provided with logic to identify a request to use the application (e.g., 235, 240) with a particular virtual service (e.g., 220) and automatically modify the address information in the application (e.g., 235, 240) to at least temporarily point outbound requests of the application to the system (e.g., 215) hosting the particular virtual service (e.g., 220) instead of the network location (e.g., 120a) of the application (e.g., 270) simulated by the particular virtual service (e.g., 220).

In some implementations, example plugins (e.g., 255, 260) may further provide a graphical user interface to accept requests from a user relating to functionality of the virtualization system. In one example, each of the plugins (e.g., 255, 260) associated with the virtualization system 105 may provide a common, or standardized, user interface. Accordingly, in an environment including a variety of different types of applications (e.g., 235, 240), each with a respective plugin (e.g., 255, 260), a user managing the environment may be provided with a familiar, common user interface to prepare any one of the variety of applications for interaction with one or more virtual services. The user interface may additionally be used to trigger the recording of transactions between a corresponding application (e.g., 235) (interoperating with the plugin (e.g., 255)) and a backend application (e.g., 275) from which transaction data (e.g., 222) may be generated. The transaction data 222 may form the basis of a service model 210 from which a new or modified virtual service (e.g., 220) may be generated. The user interface of the plugin may then be used to launch, or playback, the virtual service. For instance, a user may request, through the user interface, that a particular virtual service should be used to simulate another application (e.g., 275) with which the corresponding application (e.g., 235) interacts. This request may cause the plugin to identify and modify a corresponding location reference within the application (e.g., 235) to cause requests of the application to be redirected to the virtual service instead of the modeled application, among other example features.

Software components (e.g., 235, 240, 245, 250) that are to interoperate with plugins (e.g., 255, 260) associated with an example virtualization system 105 may be hosted on a variety of different systems. An example application server (e.g., 110*a-b*) may include, for instance, one or more processor devices (e.g., 228, 230), one or more computer memory elements (e.g., 232, 234) and a variety of software programs run (e.g., on an operating system of the server 110*a-b*) using the processor devices. In some implementations, an application server system (e.g., 110*a-b*) may host one or more different applications (e.g., 235, 240) of potentially multiple different types and from multiple different vendors. These applications (e.g., 235, 240) may each consume data and services from, or otherwise interface with, other applications (e.g., 270, 275) hosted by other systems (e.g., 120*a-b*). In some instances, to facilitate complex service oriented architectures, middleware programs (e.g., 245, 250) may be provided to orchestrate communication between applications (e.g., 235, 240) and various services (e.g., 270, 275). For instance, middleware programs (e.g., 245, 250) may be implemented using one or more enterprise service buses (or ESBs) of various types and providers. An ESB (e.g., 245, 250) may facilitate and/or enhance communications between applications (e.g., 235, 240) on one side of the ESB and applications or services (e.g., 270, 275) on the other side of the ESB. An ESB may provide a variety of features and functions, with some types of ESBs providing higher-level functions than other types of ESBs. As examples, ESBs and other middleware (e.g., 245, 250) may provide such functions and features as invocation, routing, mediation, business process choreography, service orchestration, complex event processing, quality of service (QoS) management, security, logging, operating system agnosticism, protocol conversion, support for various message exchange patterns (MEPs), integration adapters, data transformation, data and transaction, policy enforcement, abstraction, message splitting and merging, among other examples.

In cases where middleware (e.g., 245, 250) is the software component that interfaces directly with another software component (e.g., 270, 275) that is to be virtualized (i.e., replaced with a corresponding virtual service), the middleware may also be the software component that is to interface with the corresponding virtual service. To support such interactions, in some cases, plugins (e.g., 255, 260) associated with a virtualization system (e.g., 105) may be provided that are adapted to interoperate with (and locate outbound references) within an ESB or other middleware application (e.g., 245, 250), as shown in the example of FIG. 2. In some cases, references to network locations (e.g., 120*a-b*) of destination applications (e.g., 270, 275) where outbound requests (e.g., originally generated by applications (e.g., 235, 240)) are to be forwarded or sent by the middleware (e.g., 245, 250), may be recorded in a reference file (e.g., 262, 264) or other data of the middleware (e.g., 245, 250). As an example, a particular Extensible Markup Language (XML) file, Java Archive (JAR) file, or other type of file (e.g., 262, 264) may be designed to be used by a particular type of middleware to store universal resource locator (URL), port, and/or other address information as an outbound reference to be used to direct certain types of requests to a corresponding remote application or service. A plugin (e.g., 255, 260) corresponding to the type of middleware may include logic capable of identifying the location of outbound references of the middleware by identifying the particular file as well as the location within the file of a corresponding address reference (e.g., URL). Accordingly, the plugin may automatically overwrite address information in the address reference in response to a request to redirect requests to a particular virtual service, such that the address reference instead points to an address of the system hosting and providing the virtual service. In some example, the address of the virtual service system (e.g., 215) may be provided through a graphical user interface of the plugin. In other examples, the plugin (e.g., through an API to the virtualization system and/or observing the generation of a virtual service associated with the request to record transactions, generate, and/or launch the virtual service) may map a request to virtualize a particular software component to a corresponding virtual service and its host and automatically overwrite the reference file's address information to redirect requests to the virtual service, among other example implementations.

In some implementations, a development system 115 can be provided to assist developers in performing software development related tasks, including testing, which may make use of virtual services 220 launched through a virtualization system (e.g., 105). In one example, a development system 115 can include one or more data processing apparatus 276, one or more memory elements 278, and software development tools (implemented in hardware and/or software) such as a testing system 280. In one example, a testing system can monitor performance of one or more software components (e.g., 235, 240, 245, 250, 270, 275) within one or more transactions. In some cases, the testing system 280 can orchestrate the provisioning of one or more virtual services 220 to stand-in for one or more software components to be involved in the test transactions. Further, the testing system 280 can prompt one or more components of a system to send particular requests to launch types of transactions to be monitored during the test. Tests can be defined in test cases 285, accessible by the testing system 280 to drive a particular test involving a particular subset of components of a system. Further, a test case 285 can dictate which software components to virtualize (e.g., using corresponding virtual services) and which software components to monitor (i.e., for performance in the conditions set up within the test transactions). For instance, a test case 285 can define a set of inputs to be provided to one or more software components under test, which can trigger one or more test transactions involving the software components. A test case 285, in some instances, may further define a set of acceptable or expected performance parameters such that the test system 280 may determine whether the monitored software components under test have performed in an acceptable manner. Indeed, testing system may generally monitor performance of one or more particular software components in the test to derive test results indicating their performance during test transactions monitored using the testing system 280, among other examples.

Software components can be hosted by the same or multiple physical computing systems in an environment 200. Components hosted by these systems (e.g., 235, 240, 245, 250, 270, 275, etc.) can be virtualized by obtaining transaction data describing behavior of the software components and generated corresponding service models 210 (e.g., using model generator 205). For instance, servers can include remote or local application servers (e.g., 120*a-b*), database systems, among other examples. Server systems can each include one or more processors (e.g., 286, 288) and one or more memory elements (e.g., 290, 292) encoded with machine-executable instructions to implement software components (e.g., 270, 275) hosted by the servers.

Transaction data (e.g., 222) can describe request-response pairs within transactions, including attributes of the requests and responses such as the values included in the requests and responses, timing of the requests and responses, the transport details regarding how the requests and responses are communicated between components, among other examples. Transaction data (e.g., 222) can further describe one or more characteristics associated with the activity and/or the context in which that activity occurs. For instance, transaction data can be generated to describe actual transactions monitored and recorded, for instance, using connection monitors, agents (e.g., 264, 265) deployed on one or more components involved in the recorded applications, among other mechanisms. Transaction data can include information collected by the monitoring components (e.g., agents 264, 265, connection monitor, etc.) describing characteristics observed by the monitoring component including information beyond the attributes of the recorded requests and responses, such as information concerning the context or environment in which the recording takes place. Transaction data 222 can also be defined manually by users or be derived from other data (e.g., specification or design data describing intended functionality of one or more components to be modeled), among other examples.

In some implementations, transaction data 222 can include, for example, a frame identifier, which identifies a message in a transaction; a parent identifier, which identifies the requester that generated the request sent to the component or sub-component monitored by the agent; a transaction identifier, identifying the transaction, with respect to the component or sub-component being monitored; and an identifier that identifies the monitoring component that captured or generated the monitoring data, among other examples. Characteristics can further include other information describing the message or transaction such as a system clock value, current processor and/or memory usage, contents of the request, contents of the response to the request, identity of the requester that generated the request, identity of the responder generating the response to the request, Java virtual machine (JVM) statistics, structured query language (SQL) queries (SQLs), number of database rows returned in a response, logging information (e.g., messages logged in response to a request and/or response), error messages, session identifiers, database connection identifiers, simple object access protocol (SOAP) requests, other values generated by the monitored component that are not provided in the request or the response, web service invocations, EJB method invocations, EJB entity lifecycle events, heap sizing, and the so on. Characteristics can also include the thread name of a thread processing the request to generate the response, the class name of the class of an object invoked to process the request to generate the response, a Web Service signature used to contain the request and/or response, arguments provided as part of the request and/or response, a session identifier, an ordinal (e.g., relating to an order within a transaction), the duration of time spent processing the request and/or generating the response, state information, a local Internet Protocol (IP) address, a local port, a remote IP address, a remote port, among other examples.

Monitoring components can monitor and report characteristics independently for each transaction in which the monitored component being monitored participates. In addition to monitoring the performance of a single component and aggregating information about that component over a multitude of transactions (such that information about the performance of individual transactions can, for example, be averaged, based upon the observed performance of the component over the course of performing the multitude of transactions), monitoring components can additionally detect characteristics that are specific to and correlated with a specific transaction between a particular component and another component. More particularly, detected characteristics can be specific to and correlated with a particular request and/or response generated as part of a transaction.

In the case of transaction data generated from transaction monitoring, a variety of monitoring mechanisms, components, or logic can be used to capture requests and responses between components. Such components can include agents (e.g., 264, 265) instrumented on one or more of the components (e.g., applications 235, 240, 245, 250) involved in a transaction. As examples, agents can be instrumented on a variety of different system software components including virtual machines, applications, or software components, such as software components involved in transactions involving a Java-based system, database, .NET-based system, or other system or component. For example, in some implementations, agents can include functionality similar to functionality described, for instance, in U.S. patent application Ser. No. 11/328,510, titled "Instrumentation System and Method for Testing Software," filed Jan. 9, 2006, which is hereby incorporated by reference in its entirety as if completely and fully set forth herein. Agents can capture data as it enters or exits the software component including data describing method calls and other requests, and corresponding responses, that are exchanged between the instrumented software component(s) and other components. Agents can be used, for instance, to capture transactions between an application and a database using, for instance, a database API (not shown) used by the software component (or application, virtual machine, etc.) to interface with databases, among other examples. Not only can agents capture the contents of requests and responses, but agents can also capture context data, such as session data, connection data, timing data, and other information that can be used to associate various requests and responses together. Agents can inspect the internal data of a component upon which it is implemented and such internal data can also be reported as context data. Such context information can be further used to identify correlations between multiple services or components within a transaction context.

In some cases, instrumentation agents (e.g., 264, 265), or agents, can be software-implemented agents that are configured to provide visibility into the operations of each instrumented component to one or more agent managers provided in connection with a virtualization system. Each instrumentation agent (e.g., 264, 265) can be configured to detect requests and responses being sent to and from the component in which that agent is embedded. Each agent can be configured to generate information about the detected requests and/or responses and to report that information to an agent manager (e.g., 225) within, coupled to, or otherwise associated with a virtualization system (e.g., 105). Additionally, each agent can be configured to detect and report on activity that occurs internally to the component in which the agent is embedded.

In some cases, there may be a single instrumentation agent per component, while other embodiments may be implemented differently. For example, in some systems, there can be a one-to-one correspondence between the number of instrumentation agents within a component and the number of processes (or other subcomponents) to be monitored within that component. In such embodiments, each instrumentation agent monitors and reports on its corresponding sub-component. In other instances, a single agent can monitor and have visibility into multiple components, among other examples.

As noted above, a model generator 205 can obtain a variety of information concerning transactions from the various forms of transaction data (e.g., 222) identified as corresponding to the transactions and components to be modeled. Service model generator 205 can organize this information, for instance, to group information relating to common components, transaction fragments, transactions, and sessions (involving multiple transactions) and generate service models 210 from the transaction data 222. Service models 210 can include models that model a single service or component as well as composite service models that model multiple services and/or components within a business transaction including multiple correlated transactions involving the multiple components, among other examples.

As noted above, service model generator 205 can organize information in transaction data 222 so that information that describes characteristics of a particular transaction or business transaction involving multiple correlated transactions is grouped with other information describing the same transaction. Thus individual frames, each of which can be received from a different instrumentation agent or other monitoring component can be organized into groups of frames that describe a complete transaction. Such grouping can be based on detecting correlations between requests and responses, including timing information indicating a temporal relationship between the transactions, common tags inserted by an agent in intercepted requests and responses, an identified parent-child or requester-responder relationship between components in the transaction, common values (e.g., transaction ID, customer ID, session ID, etc.) included in captured requests and responses, recurring patterns in conversations or flow between the components participating in transactions, among other examples.

In some cases, agents and other monitoring components can be provided with functionality for tagging data of a request or response monitored by the agent before it exits or enters the component it monitors, the tag identifying a particular session or transaction to which the request or response and corresponding characteristic information belongs. After being sorted, the frames can be arranged in ascending or descending order, for instance, using timing information, inserted tag data, or other information. For example, the frames can be sorted according to a timestamp indicating when each frame was generated, when one or more requests identified in each frame were generated or received, and/or when one or more responses identified in each frame were generated or received. In some embodiments, the frames can be sorted based upon multiple pieces of timing or other flow information. Additionally, a flow can be identified by identifying the requester/responder, parent/child relationships of each portion of the business transaction, among other information.

Within a group of frames associated with the same transaction or session, service model generator 205 can order the frames, such that the flow of the transaction can be followed from the start of the transaction to the end of the transaction. Each frame can include a field that identifies that frame (e.g., a frame ID), as well as a field that identifies a parent frame (e.g., a parent frame ID). The value of each frame's parent frame ID can equal another frame's frame ID. These frame identifiers can be generated, in some cases, by the agents. In one embodiment, the frame identifiers can be generated from information identifying the IP address (or other addressing information), port number, session identifier, or other information used by the monitored component or sub-component, the amount of data sent or received by the monitored component during the monitored activity, and/or the instrumentation agent itself.

A virtual service engine 215 can use a set of expected requests and responses defined in service models 220 to provide one or more virtual services simulating operation of a modeled component, such as a database, applications (e.g., 270, 275), mainframe components, or other component. Service models 210 can further support stateful virtualization and imitate a series of particular requests in a session. In one example, virtual service engine 215 can include hardware- and software-based components to instantiate or launch virtual services 220 from service models 210. Instantiation of a virtual service can include deploying logic in a computing device and/or virtual machine that is to host the virtual service and serve as the redirect target for intercepted requests intended for the real world, or live version of the component simulated using the virtual service. A virtual service engine 215 can build a virtual service environment within a hosting device or virtual machine and provision the virtual service environment with virtual service logic 220 that is to access a particular one of the service models 210 and generate synthetic responses to received requests based on the particular service model.

A virtual service 220 can be provided to stand-in for an unavailable, real world version of the modeled component. For example, it can be identified that a dependency of an application (e.g., 235 or 250), such as another application (e.g., 270), is unavailable. A virtual service model 10 corresponding to the dependency can be identified and a corresponding virtual service simulating the other application (e.g., 270) can be initiated. Such virtual services can be generated and provided according to principle described in U.S. Pat. No. 8,112,262 entitled "Service Modeling and Virtualization", among other examples. For instance, in some cases, virtual service engine 215 can provision a virtual service 220 in a virtual machine with which a software component can interact with directly in lieu of the modeled dependency. In other instances, virtual service engine 215 can implement a virtual service utilizing agents (e.g., 264, 265) to provide the responses of a virtualized dependency (e.g., rather than interacting with the virtual service 220 logic through a virtual machine or other virtual service environment hosting the virtual service 220). For example, virtual service engine 215 can communicate with agents provisioned on the consuming system to intercept particular requests from the consuming component and generate synthetic responses (using virtual service logic 220) consistent with a transaction defined in a corresponding service model 210, such that the synthetic responses fed through the agents mimic the response that would be received from a live version of the modeled software component.

As noted, service models (e.g., 210) generated by a model generator 205 can be based on requests and responses between two or more software components or systems. Requests that are to be sent to a real world version of a virtualized component can be intercepted and directed to the virtual service 220 standing in its place. A virtual service engine 215 and/or virtual service environment hosting the virtual service 220, can receive intercepted requests intended for the virtualized component and identify respective transactions (or request-response pairs), defined in a service model (e.g., 210) corresponding to the virtualized component, that corresponds to a request of that type and having similar attributes values or types. The service model can further describe characteristics of the transactions. Such information can include timing information identifying time thresholds or limits at which particular requests and/or responses are detected or sent (e.g., in order to identify the delay between when the request was detected and/or sent and when the associated response was detected and/or sent), and the like. Virtual services instantiated from such service models can embody these performance characteristics captured or defined in the service model, including response times, network bandwidth characteristics, processor usage, etc.

In one example, a virtual service engine 215 can be configured to identify and describe requests and responses in each of a variety of different protocols as well as the pertinent information from each. Thus, service models can include configuration information identifying the basic structure of requests and responses for each of several supported communication protocols. Depending upon the protocol in use, for instance, requests can take the form of method calls to an object, queue and topic-type messages (e.g., such as those used in Java messaging service (JMS)), requests to access one or more web pages or web services, database queries (e.g., to a structured query language (SQL) or Java database connectivity (JDBC) application programming interface (API)), packets or other communications being sent to a network socket, and the like. Similarly, responses can include values generated by invoking a method of an object, responsive messages, web pages, data, state values (e.g., true or false), and the like.

Service models 210 can be used as the basis of virtual services modeling the software components providing the requests and/or responses modeled in the service models 210. Virtual services can capture and simulate the behavior, data and performance characteristics of one or more unavailable or inaccessible component, making synthetic substitutes of the components available, for instance, in connection with development and testing efforts throughout the software lifecycle, among other advantages. Virtual services, generally, can provide functionality beyond traditional piecemeal responders or stubs, through logic permitting the recognition of input/requests and generation of outputs/responses that are stateful, aware of time, date, and latency characteristics, support such transaction features as sessions, SSL, authentication, and support string-based and dynamic request/response pairs, among other features. Service virtualization and other virtual models can be leveraged, for instance, when live systems are not available due to project scheduling or access concerns. In cases where components have not been built yet, environments can employ virtual services to rapidly model and simulate at least some of the software components to be tested within an environment. Virtual services 220 can be invoked and executed in a virtual environment implemented, for instance, within on-premise computing environments, agents, in private and public cloud-based lab, using virtual machines, traditional operating systems, and other environments, among other examples.

As noted above, in some implementations, when a service model 210 is used to instantiate a virtual service 220, the virtualization process can involve comparing new requests generated by a requester (e.g., a client application under development) to the request information stored in a corresponding service model. For example, if a new request containing a particular command and attributes is received, the service model can be searched for a matching request that contains the same command and attribute. If a matching request is found, the virtualization process returns the response (as identified by information stored in service model) associated with the matching request to the requester.

In many situations, the requests provided to a virtual service 220 will not be exactly the same (i.e., containing the same request as well as the same attribute(s)) as the requests identified in service model. For example, a request provided to the corresponding virtual service may contain the same request but a different attribute or set of attributes. A service model can further include information usable to handle these requests. For instance, transactions containing requests that specify the same command can be identified as being of the same transaction type. Alternatively, a set of transactions can be identified as being of the same type if all of those transactions have requests that include the same command as well as the same number and type of attributes. The particular technique used to identify whether two or more transactions are of the same type can be protocol specific, in some embodiments (e.g., classification of transactions can be at least partially dependent upon the particular communication protocol being used between the requester and the server).

For each unique type of transaction included in a service model 210, some implementations of a service model can further provide information or instructions for use by a virtual service in generating responses to requests with unknown attributes (e.g., an unknown attribute that was not observed as part of the monitored traffic or even specified by a user during a manual service model building process). Further, service models can also include information describing how to respond to an unknown request (e.g., a request that contains a command that was not observed as part of the monitored traffic). As an example, the request portion of this service model information can indicate (e.g., through the use of a wildcard command identifier) that all unknown types of requests that are not otherwise identified in service model should match this request. The response portion of the generated information can include an appropriate response, among other examples.

In addition to adding information describing unknown transactions of known and unknown types, some implementations of service models 210 can support time sensitive responses. In such embodiments, response information in the server model can facilitate substitution of time sensitive attributes for actual observed attributes. For instance, an actual attribute "10:59 PM Oct. 1, 2009" can be replaced with a time sensitive value such as "[SYSTEM CLOCK+11 HOURS]". When the service model is used to generate responses by the virtual service, the time sensitive value can be used to calculate the appropriate attribute to include in each response (e.g., based on the current system clock value). To illustrate, in this particular example, if the service model is being used by a virtual service and the response attribute includes the time sensitive value [SYSTEM CLOCK+11 HOURS], the response generated based upon the service model will include the value generated by adding 11 hours to the system clock value at the time the request was received. In general, time sensitive values specify an observable time, such as a time value included in a request or the current system clock time, and a delta, such as an amount of time to add or subtract from the specified observable time. Time sensitive values can be included in the response information for all types (known and unknown) of transactions.

In some implementations, a service model 210 can further include information facilitating the use of request sensitive values to be included in responses generated by the virtual service using the service model. A request sensitive value can link an attribute included in the request to a value to be included in the response. For example, response information in a service model can indicate that a particular request attribute be used as the basis of a particular attribute of the response to be returned in response to the request.

When the model 210 is used, the response generated by the virtual service 220 may include the value indicated by the request sensitive value. For example, the model can include three known transactions of a given transaction type, as well as one unknown transaction of that type. The information describing the unknown transaction can indicate that the single response attribute is a request sensitive attribute that should be the same as the first attribute of the request. A request of that type that contains an unknown first attribute (i.e., an attribute that does not match the attribute(s) stored for the three known transactions of that type in the model) can be sent to the virtualized service. In response to receiving this request and accessing the request sensitive value specified in the response information for the unknown transaction, the virtualized service returns a response that includes the value of the first attribute that was contained in the received response. As an example, if the information describing a known transaction of type A indicates that the request includes the string "UserID" as the first request attribute and that the corresponding response includes the string "UserID" as its second response attribute, a request sensitive value specifying "[REQUEST ATT 1]" (first request attribute) can be generated for the second response attribute in the service model, among many other potential examples, including more complex examples with more complex dependencies defined in the service model between certain request attribute and request sensitive response attributes.

A service model 210 can include still additional information. For example, a service model can identify characteristics of each transaction in order to identify availability windows for a corresponding software component modeled by the service model, load patterns for the software component, and the like. For example, if an access window is identified for a particular type of transaction, a corresponding service model can be generated to include a characteristic indicating that a response (or a particular type of response) will only be generated if the request is received during the identified access window, among many other potential examples.

Turning to FIG. 3, a simplified block diagram is shown representing an example view of an example service model 300. For instance, FIG. 3 shows information that can be maintained as part of a service model. In this particular example, service model 300 can include a row for each of several transactions. Each row of service model 300 can identify a command, zero or more attributes, zero or more characteristics, and one or more response attributes. This service model can be stored in a spreadsheet, table, database, or any other data structure and may include additional information, such as the information described in one or more of the examples above.

In this example, transaction 301(A) is a transaction corresponding to a scenario defined in an interaction contract defined between two or more developers. In other instances, transaction 301(A) can be a transaction that was an observed transaction that actually occurred between a requester and a server component being modeled, as detected, for instance, by an agent or other tool. The information describing transaction 301(A) can include request information, which includes command 311 and zero or more defined attributes 321(1). The information describing transaction 301(A) can also include response information 341(1) describing the expected response that corresponds to the request. This response information 341(1) can also include one or more attributes. Characteristics 331(1) can include zero of more characteristics of transaction 301(A) defined based on scenarios of the interaction contract. These characteristics can include timing information describing a threshold delay of a response to a request or the like, as described above.

Transaction 301(B) can be of the same transaction type as transaction 301(A), since both transactions included a request that contained command 311. Transaction 301(B) is described by attributes 321(2) (which can have values that differ from those attributes defined in the request of transaction 301(A)), characteristics 331(2) (which can again differ from those for transaction 301(A)), and response 341(2) (which can also have a value that differs from the response defined for transaction 301(A)).

In this example, information describing n (an integer number) known transactions of the same type as transactions 301(A) and 301(B) is stored in service model 300. These known transactions are transactions that were either generated from scenario data or manually specified by a user. As part of the model building process, information describing an n+1th transaction of the same type has been added to service model 300 by the service model generator. This n+1th transaction, labeled transaction 301(n+1), can describe an "unknown" transaction of a known type of transaction. Such an unknown transactions is of a known type because it has the same command, command 311, as the other transactions of this type. However, unlike the other known transactions of this type, unknown transaction 301(n+1) can be used to respond to requests containing command 311 and "unknown" attributes that do not match those known attributes stored for transactions 301(A)-201(n) (not shown). The information describing transaction 301(n+1) thus includes information (e.g., wildcard information) identifying unknown attributes 321(n+1), such that any request that includes command 311 and an attribute that does not match the defined attributes stored for the actual transactions (e.g., such as transactions 301(A) and 301(B)) will match the request information for transaction 301(n+1). The information describing transaction 321(n+1) can also include default characteristics 331(n+1) and default response 341(n+1). These default values can be copied from the corresponding fields of an actual response of the same type.

Information describing another set of transactions of a different type can also be stored within the service model 300 for a particular software component. As shown, m+1 transactions, including transaction 302(A), 302(B), and 302(m+1) of a type of transaction in which the request includes command 312 can be stored in service model 300. Like transactions 301(A) and 301(B), transaction 302(A) can be another transaction corresponding to a scenario and involving the particular software component. Further, the information describing this transaction can also include the corresponding command 312, attributes 322(1) (if any), defined characteristics 332(1) (if any), and corresponding response 342(1).

In some instances, a model generator can automatically generate a set of requests and responses, together with corresponding attributes and characteristics of the requests and responses based on computer-parsable scenario data provided to the model generator. In some implementations, a user can supplement the transaction defined by the model generator with one or more user-specified transactions, for instance, in the event of a change or exception to the interaction contract or to capture a nuance not adequately detected and captured by the model generator, among other examples. For instance, a user can enter the information describing such a transaction via a user interface. The information describing transaction 302(B) can include command 312, zero or more user-specified attributes 322(2), zero or more user-specified characteristics 332(2), and a user-specified response 342(2). In some embodiments, the user is prompted for entirely new information for each of these user-specified fields. In other embodiments, the user can be allowed to select an existing field (e.g., of another user-specified transaction or of an automatically-detected transaction) to copy into one or more of these fields. It is noted that a user can also create a user-specified transaction by modifying information describing an actual transaction. As FIG. 3 shows, user-supplied transaction information can be stored in the same model as transaction information generated from parsing of scenario data of an interaction contract. In other instances, service models can be generated that are dedicated to user-supplied transaction information while others are dedicated to transaction information generated from scenario data by a model generator. The generated set of requests and responses can also be saved for later retrieval and uploading by the user via GUI of a virtualization system plugin (e.g., 255, 260), among other examples.

In some instances, a service model 300 can also include information describing an unknown transaction 302(m+1). The information describing transaction 302(m+1) was added to service model 300 after m (an integer number, which does not necessarily have the same value as n) known transactions were described by the model. The information describing this unknown transaction 302(m+1) can be used to handle requests of the same type (e.g., containing command 312) that specify unknown attributes. Accordingly, the information describing transaction 302(m+1) can include command 312, unknown attributes 322(m+1) (i.e., attribute information that will match any attributes not identified in the known attributes stored for the other m transactions of this type), default characteristics 332(m+1), and default response 342(m+1). Further, transactions of an unknown transaction of unknown type (e.g., 303) can also be defined in a service model 300. For instance, the information describing transaction 303 can be used to respond to any request of a type not already described by another row of service model 300. Accordingly, a request containing a command other than commands 311 and 312 could be responded to using the information describing transaction 303, among other examples. As shown, the information describing transaction 303 includes unknown command information 313, which is configured to match any command not already specified in service model 300, unknown attribute information 323, which is configured to match all attributes (if any) associated with unknown commands, default characteristics 333, and a default response 343. As with the default characteristics and responses associated with unknown transactions of known type, transaction 303's default characteristics and response can be user-specified.

Figure 4:
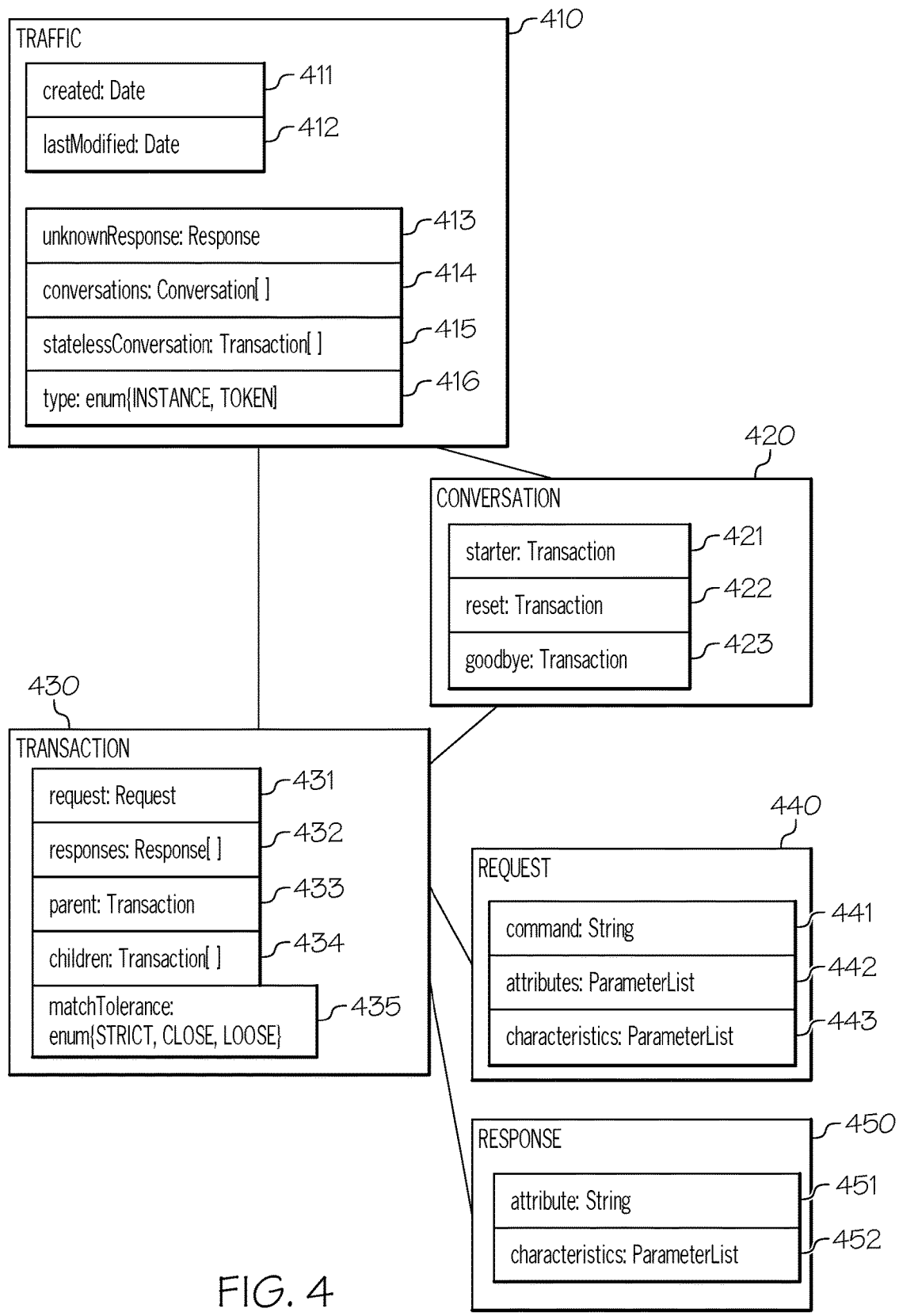
FIG. 4 is a simplified block diagram illustrating aspect of another example service model in accordance with at least one embodiment.

Turning to FIG. 4, a simplified block diagram is shown illustrating representing example features of an example service model for use in virtual services supporting stateful and stateless transactions. Statefulness of a transaction can be identified from parsing of scenario data to generate a service model supporting the modeling of such stateful transactions. In the example of FIG. 4, a data model is shown that includes five data patterns: traffic pattern 410, conversation pattern 420, transaction pattern 430, request pattern 440, and response pattern 450. Traffic pattern 410 can be used to store information identifying a particular software application to be developed in accordance with an interaction contract and the transactions of such an application. Each service model can include a single instance of traffic pattern 410. As shown, traffic pattern 410 includes created field 411, which stores date information identifying when the service model of that particular application was initially created. Traffic pattern 410 also includes lastModified field 412, which stores date information identifying the most recent time at which any of the information in the service model of the particular service was modified.

Traffic pattern 410 can also include an unknownResponse field 413. UnknownResponse field 413 can store information identifying the particular instance of the response pattern that stores information identifying the response to use for unknown transactions of unknown types. Accordingly, in embodiments employing the data pattern of FIG. 4, if an unknown transaction of unknown type is detected by a request processing module, the request processing module will use the response pattern instance identified in unknownResponse field 413 to generate a response.

Traffic pattern 410 includes conversations field 414. Conversations field 414 can identify one or more instances of conversation pattern 420. Conversation pattern 420 stores information representing a set of two or more stateful transactions. Such a set of stateful transactions is referred to herein as a conversation. The instance(s) of conversation pattern 420 identified in conversations field 414 identify all of the conversations for the application to be modeled. If the particular service does not include any stateful transactions (e.g., if no stateful transactions are identified from scenarios defined for an interaction contract), conversations field 414 will not identify any instances of conversation pattern 420.

Traffic pattern 410 can additionally include statelessConversation field 415. This field can identify one or more instances of transaction pattern 430. Transaction pattern 430 stores information representing a transaction. Each instance of transaction pattern 430 identified in statelessConversation field 415 stores information identifying a stateless transaction. StatelessConversation field 415 can identify instances of transaction pattern 430 associated with both known and unknown transactions of known types. If the particular service being modeled does not include any stateless transactions, statelessConversation field 415 will not identify any instances of transaction pattern 430. Type field 416 can store one of two values: INSTANCE or TOKEN that identifies the type of stateful transactions, if any, provided by the service being modeled.

As noted above, conversation pattern 420 can store information identifying a set of stateful transactions. A given service model can include n instances of conversation pattern 420, where n is an integer that is greater than or equal to zero. Conversation pattern 420 can include a starter field 421. This field stores information identifying an instance of transaction pattern 430 associated with a starter transaction. The starter transaction is a transaction that acts as the first transaction in a stateful series of transactions (e.g., a login transaction). In at least some embodiments, all starter transactions can be unknown transactions of known type, as will be described in more detail below. The particular transaction type to use as a starter transaction can be specified by the model generator or a user during the service model configuration process.

Conversation pattern 420 also includes reset field 422. Reset field 422 stores information identifying one or more instances of transaction pattern 430, each of which is associated with a reset transaction (such a reset transaction can be a known or unknown transaction). The value of reset field 422 can be provided by a user (e.g., the user can be prompted to identify the reset transaction(s) for each conversation). A reset transaction is a transaction that, if detected, causes the flow of the conversation to return to the point just after performance of the starter transaction. Conversation pattern 420 also includes a goodbye field 423. This field stores information identifying an instance of transaction pattern 430 associated with one or more goodbye transactions (of known or unknown type) for the conversation. A goodbye transaction is a transaction that causes the conversation to end. To reenter the conversation after a goodbye transaction is performed, the starter transaction for that conversation would need to be re-performed.

Transaction pattern 430 stores information identifying a transaction. Transaction pattern 430 includes request field 431, responses field 432, parent field 433, children field 434, and matchTolerance field 435. Transaction pattern 430 can be used to store stateful and stateless transactions (in some instances, the same transaction can occur both within a conversation and in a stateless situation where no conversation is currently ongoing). Transactions that are always stateless will not include values of parent field 433, children field 434, or matchTolerance field 435.

Request field 431 identifies the instance of request pattern 440 that stores information identifying the request (e.g., by command and attributes) portion of the transaction. Similarly, responses field 432 identifies one or more instances of response pattern 450 that store information identifying the response(s) that are part of that transaction. Each instance of response pattern 450 stores one response attribute (e.g., like those shown in FIG. 2), and thus if responses field 432 identifies multiple response patterns, it indicates that each of the identified response patterns should be used to generate a response when the corresponding request is received.

Parent field 433 stores a value identifying the instance of transaction pattern 430 associated with the transaction that occurs immediately before the current transaction in a conversation. Thus, if transaction pattern 430 stores information identifying the second transaction in a conversation (where the starter transaction is the first transaction in the conversation), parent field 433 can identify the instance of transaction pattern 430 associated with the starter transaction. Similarly, children field 434 can store information identifying each instance of transaction pattern 430 associated with a child transaction of the current transaction. Thus, if transaction pattern 430 stores information identifying the second transaction in a conversation, children field 434 can store information identifying the instance of transaction pattern 430 that stores the third transaction in the conversation. It is noted that children field 434 can identify more than one transaction.

MatchTolerance field 435 can store one of three values: STRICT, CLOSE, or LOOSE. The stored value indicates the match tolerance for a request received immediately subsequent to the current transaction. Strict tolerance indicates, for instance, that, if a conversation is ongoing, the request received immediately after the current transaction is only allowed to match transactions identified in the current transaction's children field 434. If instead close tolerance is specified, the request received immediately after the current transaction can match any of the current transaction's children, as well as any of the current transaction's sibling transactions. Further, if loose tolerance is specified, even more transactions are candidates for matching the next received request, and so on.

Request pattern 440 can include a command field 441, attributes field 442, and characteristics field 443. Each instance of request pattern 440 stores information identifying a particular request. A service model generator can allocate an instance of request pattern 440 for each transaction of known or unknown type. Command field 441 can store a string that identifies the command contained in the request. Attributes field 442 can store a parameter list that includes zero or more parameters, each of which represents an attribute of the request. Characteristics field 443 can store a parameter list identifying zero or more characteristics associated with the request. Each parameter in the list can identify a different characteristic. Examples of characteristics can include the time at which the request was sent, the system clock time at which the request was received by the service being modeled, network and/or system conditions that were present when the request was received, and the like. The parameters stored in characteristics field 443 can be used to generate time sensitive values, as well as to model actual conditions such as response timing and availability window, among other examples.

Response pattern 450 can include an attribute field 451 and a characteristics field 452. Attribute field 451 stores a string that represents a response attribute. As noted above, a given transaction can have multiple response attributes (e.g., responses field 432 of transaction pattern 430 can identify multiple instances of response pattern 450), and thus generating a response can involve accessing multiple response patterns in order to include the string identified in each of the response patterns' attribute field 451 in the response. Attribute field 451 can store one or more response attributes, as well as values, like request sensitive values and time sensitive values, generated by the service model generator. Characteristics field 452 can store a parameter list containing zero or more parameters. Each parameter can identify a characteristic of the response, such as the system clock time when the response was sent to the requester by the service, network and/or system conditions that were present when the response is to be sent, and the like.

Figure 5:
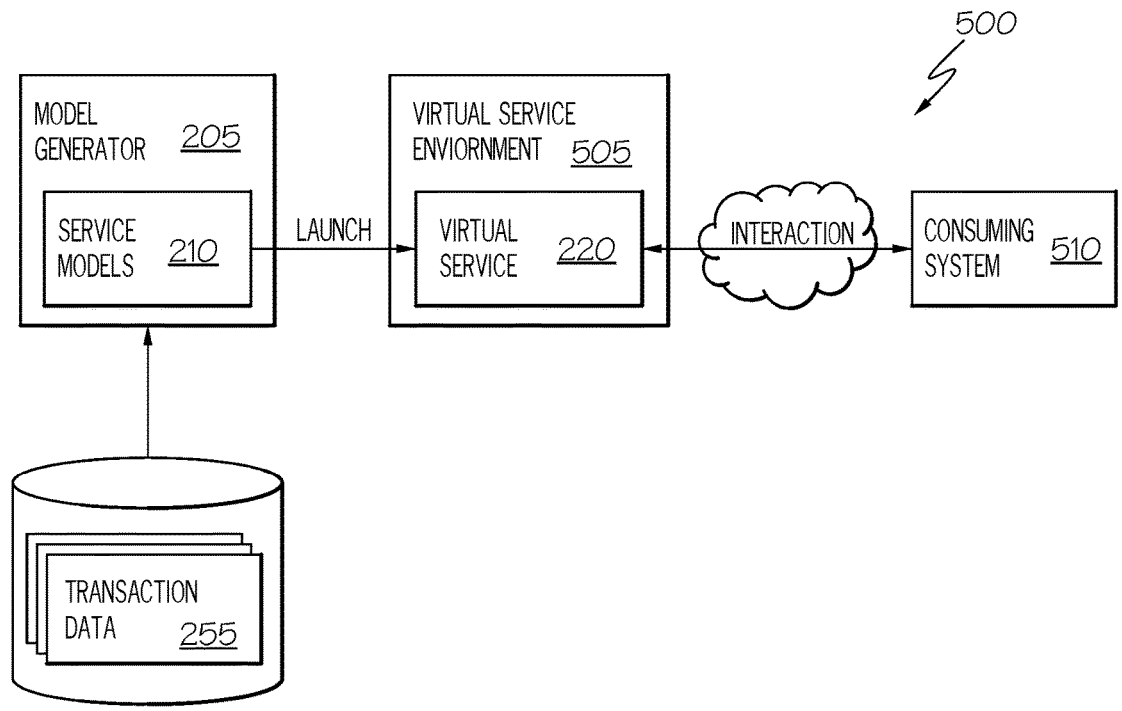
FIG. 5 is a simplified block diagram illustrating example instantiation of a virtual service in accordance with at least one embodiment.

Turning now to FIG. 5, a simplified block diagram 500 is shown illustrating an example instantiation of a virtual service 220. A model generator 210 can access transaction data 255 from one or more data sources (e.g., data stores, agents, user device memory, etc.) and generate one or more service models 210 to model response behavior of a particular software component. In some cases, multiple service models 210 can be generated for the same software component, such as a first service model based on a first subset of the transaction data 255 (e.g., collected entirely from agents monitoring live transactions of the software component) while a second service model is based on a second subset of the transaction data 255 (e.g., that includes customized, user-authorized transaction data), among other examples. A virtual service 220 can be launched based on any one of the service models 210. Launching the virtual service 220 can include instantiating a virtual service environment 505 (e.g., hosted in a virtual machine or implemented using one or more agents) from which the synthesized responses of the virtual service sent and to which requests are redirected (or intercepted). The virtual service environment 505, in some implementations, may be hosted on a system remote from both the host of the model generator 205 and the consuming system 510. A consuming system 510 can then interact directly with the virtual service 220 in lieu of the software component simulated by the virtual service 220. For instance, a consuming system 510 can send requests that are intended for a particular software component and these requests can be redirected to the network location of the virtual service environment 505 for processing by the virtual service 220. The virtual service 220 can generate responses to the requests it receives from the consuming system 510 by accessing its corresponding service model 210, identifying a request within the service model 210 best approximating the received request, and identifying a corresponding response template corresponding to the request. The virtual service 220 then generates a synthesized response based on the service model 210 and returns the response to the consuming system 510 (which the consuming system interprets as having been generated and returned from the particular software component, rather than the virtual service 220).

Figure 6:
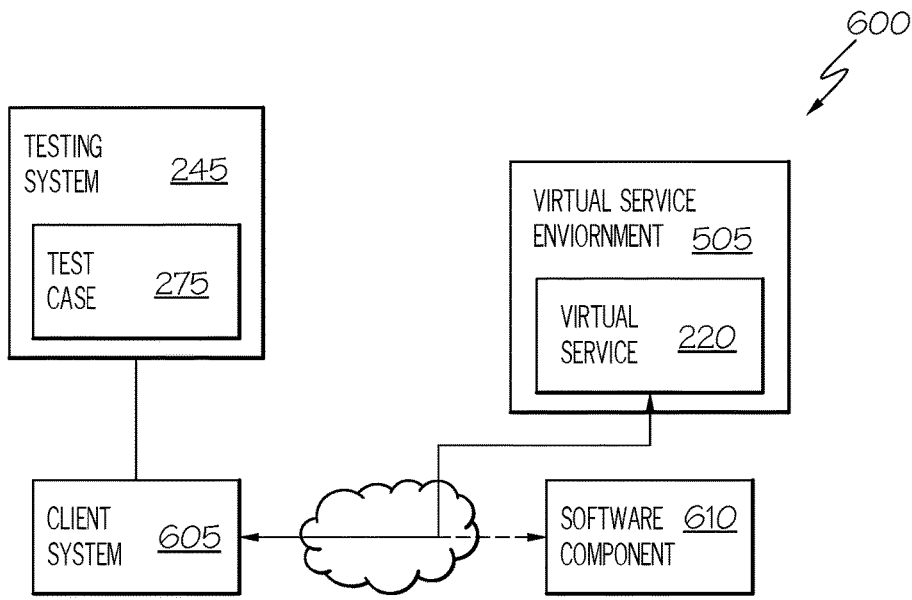
FIG. 6 is a simplified block diagram illustrating use of an example virtual service in a test of a software system in accordance with at least one embodiment.

Turning to FIG. 6, a simplified flowchart 600 is shown illustrating the use of a virtual service 220 in connection with a test of a particular client software component (e.g., 605). A testing system 245 can orchestrate a test of the client system 605 based on a particular test case 275 in a library of test cases. In some instances, rather than interacting with a live, production, or "real" version of a particular software component 610 within the test, a virtual service 220 to be instantiated in a virtual service environment 505 to stand-in for the particular software component 610. Requests intended for software component 610 can be redirected to virtual service 220 during the test. In other cases (e.g., outside the test), the software component 610 may interact directly with the software component 610 (and the virtual service 220 can be torn down).

Further, the testing system 245 can influence requests sent by the client system (or other software components involved in transactions within the test) to drive aspects of the test, such as to initiate a particular type of transaction, test particular request values, etc. The testing system can additionally provide information for use by virtual services (e.g., 220) instantiated within the system under test. For instance, the testing system 245 can cause an identifier or marker to be embedded in requests generated by a software component (e.g., client system 605) to instruct the virtual service 220 to generate a particular response within the test, such as a response in a particular language (e.g., to test how an upstream component (e.g., 605) handles or renders the response) or a response including a data set of a particular size (e.g., to test how an upstream component handles a large data set), among other examples. Indeed, testing system 245, in addition to driving a particular test, can monitor the performance of one or more software components (e.g., 605) to see how the software component handles conditions within one or more transactions. Characteristics such as response time, correct graphical rendering of data, error events, memory usage, processor usage of a software component, etc. can be measured by the testing system 245 in connection with a test case orchestrated and launched by the testing system 245.

Turning to the examples of FIGS. 7A-7D, FIG. 7A shows a simplified block diagram 700a illustrating a software system 702 that includes one or more client applications (e.g., 235a-c) connecting to backend software systems (e.g., 120a-b) hosting various backend applications and services (e.g., 270, 275) through a middleware application (e.g., 250), such as an enterprise service bus (ESB). In one example, the ESB 250 may include a reference file 262, which includes address information for use in referencing the network locations of various backend applications and services (e.g., 270, 275) to which the ESB will send outbound requests (e.g., based on or originally generated by client applications (e.g., 235a-c). The location and type of file 262 used by the ESB 250 may be specific to the design of the ESB, such that different ESB (and other middleware) utilize different forms of reference files or other data to specify outbound network locations to be used for directing outbound requests from the middleware to remotely hosted applications and services (e.g., 270, 275).

As discussed above, a plugin (e.g., 255) may be provided, which may be added to or coupled to the middleware (or even various client applications (e.g., 235a-c), in some examples) to automate the detection and modification of outbound address information used by the corresponding application (e.g., 250) to direct outbound requests to remote server systems (e.g., 120a-b). The plugin 255 may be associated with a virtualization system and may provide an API to one or more components of the virtualization system 105 and a GUI 705 to enable user-friendly management of reference data that is to be modified in connection with virtualized transactions facilitated using the virtualization system 105. In the example of FIG. 7B, a plugin 255 may be added to ESB 250 that is configured with logic for identifying the particular outbound reference data (e.g., reference file 262) used by this particular type of ESB 250. The plugin 255 may additionally include logic for overwriting location data included in the ESB reference file 262 with location data corresponding to a system hosting a virtual service environment 215 implementing a virtual service 220 to virtualize a particular application (e.g., 270) with which the ESB is to communicate. Indeed, real-world transactions involving the ESB 250 and a downstream application 270 may be recorded to generate transaction data from which a virtual service model can be generated to implement virtual service 220. These transactions may further involve one or more client applications 235a-c feeding requests through the ESB 250. The generated transactional data may then be used to directly create a new instance of the virtual service model.

Figure 7C:
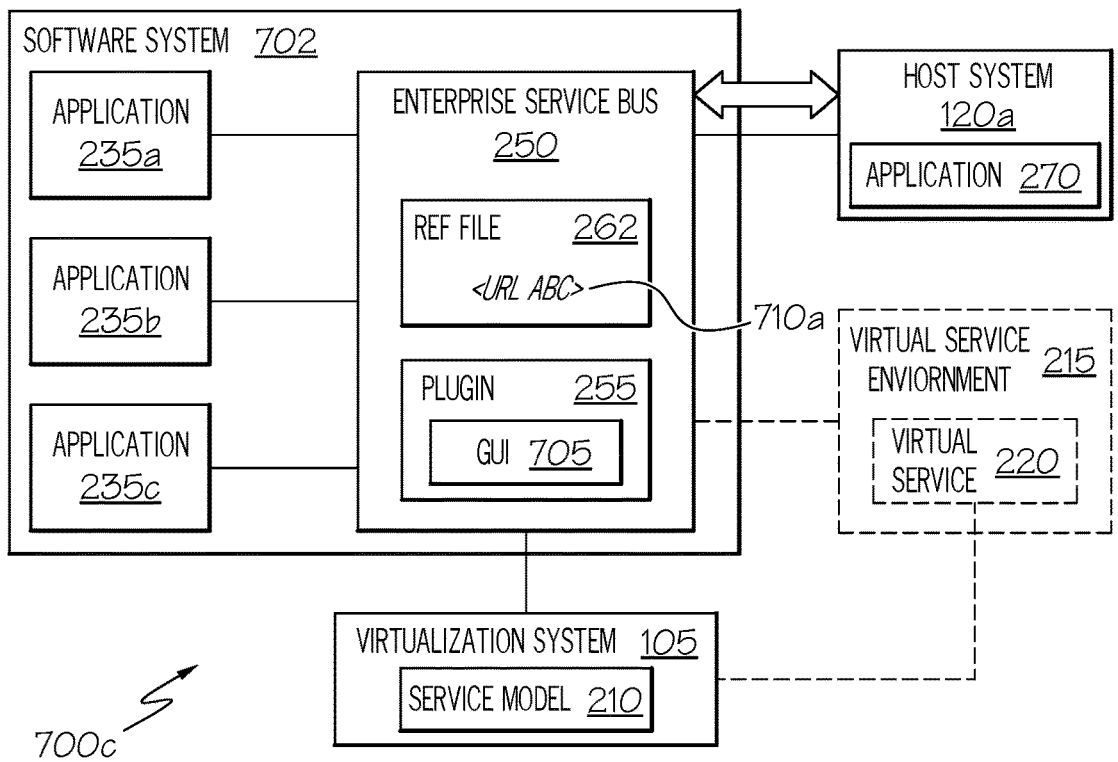

Turning to FIG. 7C, a simplified block diagram 700c shows instances of the ESB transacting with a real world version of an application 270 hosted by a particular host system 120a. In this mode, location data (e.g., URL 710a) corresponding to the particular host system may identify the location of the particular host system 120a. Accordingly, the ESB, when routing requests intended for the particular application 270, may reference the URL 710a and cause the requests to be sent to the host system 120a for handling by the application 270. Transactions between the ESB and application 270 may be recorded in this mode. Further, the GUI 705 of the plugin 255 may be used to initiate recording of these transactions. In such instances, the plugin 255 may additionally identify a name or other identifier associated with the transaction recording such that this name may be later used to automatically determine the attributes of a virtual service (e.g., 220) launched based on this recording, among other examples.

Figure 7D:
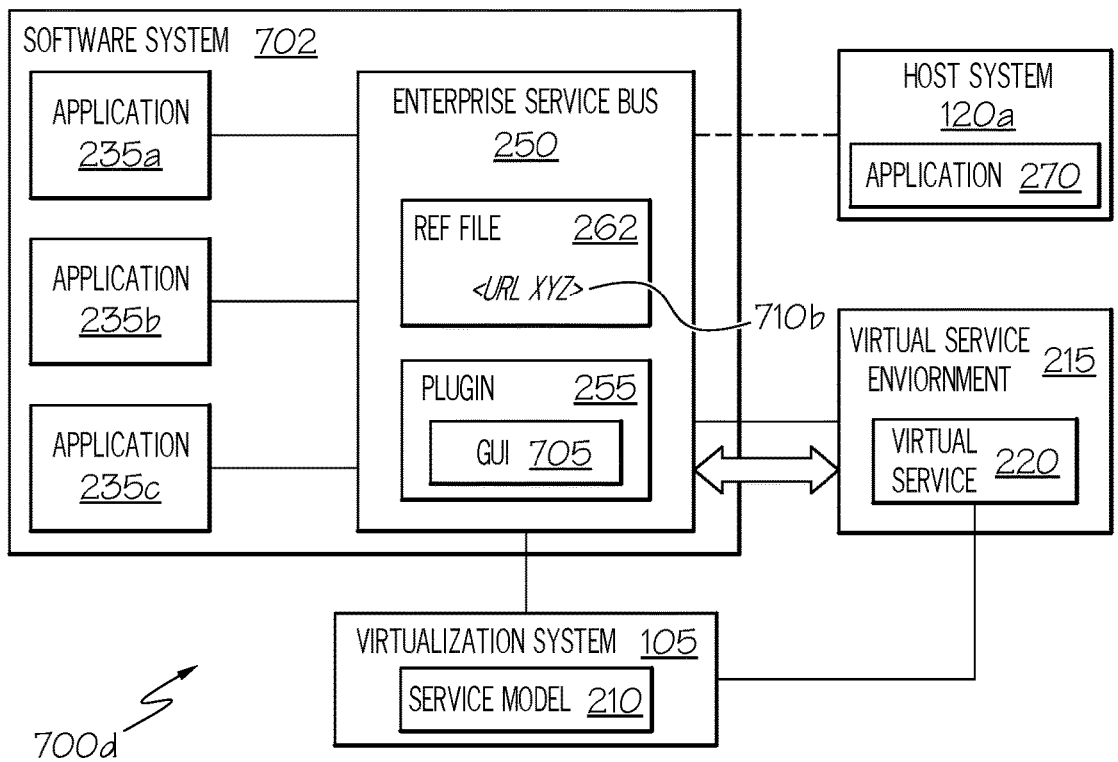

The GUI 705 of plugin 255 may additionally be used to initiate virtualized transactions between ESB 250 and a virtual service 220 simulating applications 270, such as shown in the example of FIG. 7D. In such virtualized transactions, it may be desirable for the ESB and to operate just as it would were it communicating with the real world application 270. Accordingly, to redirect traffic intended for application 270 from ESB 250 to a virtual service 220 modeling application 270, the plugin may at least temporarily overwrite the address information corresponding to application 270 to instead reference an address corresponding to the host of the virtual service 220. In this manner, the ESB operates normally and is unaware that it is transacting with a simulated version of the application 270 (i.e., provided by virtual service 220) instead of the real world version of the application 270. Accordingly, the overwritten address value (e.g., URL 710*b*) may be referenced by the ESB (from its reference file 262) to determine where to send its outbound requests intended for application 270. As a result, the ESB sends requests to the virtual service 220 and receives virtualized responses generated by the virtual service 220 simulating real world responses by application 270.

In some instances, the plugin 255 may receive the address information of the virtual service environment 215 with the request to launch virtualized transaction (or enter a "playback" mode). For instance, a user may enter a request to virtualize interactions with a particular application (e.g., 270) using a GUI 705 of a plugin 255 added to a particular ESB managing communication between various client and server applications. The request may indicate that a virtual service (e.g., 220) is to replace a particular application (e.g., 270) in upcoming transactions and the request may further include an identification of the particular virtual service. For instance, the identification of the particular virtual service may include identification of a URL, port number, virtual service name (from which additional address information may be looked up), or other address information. As an example, a virtualization prompt may be entered through the plugin GUI according to an example sytax: "$ set-playback-mode [VS_name]" or "$set-playback-mode [URL]," etc., among other examples. In some cases, the request may simply include the name of the virtual service, transaction data, or virtual service model and the plugin may determine from the identifier the address information of a corresponding virtual service environment hosting the identified virtual service. For instance, the plugin may query the virtualization system for location or network information of a virtual service identified in a virtualization request received through the GUI 705 of the plugin 255. In still other examples, the plugin may have been used in connection with the development of the virtual service and may thus already know the address of the system hosting the virtual service based on this involvement (e.g., through participation in a "record" mode used to capture real-world request response pairs involving the ESB and the modeled backend service), among other examples.

As illustrated in FIG. 7D, based on a virtualization request received through a GUI 705 of a plugin 255, the plugin 255 may automatically identify and overwrite a location or other address reference 710*b* in the reference data 262 of an example ESB (or another application) to redirect requests to a particular virtual service without further user action. This redirection of outbound traffic (based on the changed network location information (e.g., 710*b*)) may be temporary and initiated in connection with a virtualization request submitted through the GUI 705. It should be appreciated that the ESB 250 may continue to engage in transaction with live versions of other software applications while engaging in virtualized transactions with a virtual service. For instance, address information in the reference file 262 for outbound requests to another application (e.g., 275 shown in FIG. 7A) may be unaffected by the change to address information 710. Transactions with this other application may likewise be virtualized in connection with a virtualization request, which causes the plugin 255 to also overwrite the address information for the other application, among other examples.

When a virtualization session is to end (e.g., following a variety of virtualized transactions between ESB 250 and virtual service 220), the ESB may be restored or reset to transact with the real world version of the application (e.g., 270) modeled by the virtual service 220 by causing the plugin to autonomously locate the network location reference within the reference file 262 and change the value of the network location reference back to its previous value (e.g., 710*a*) corresponding to the network location of the live application 270, as illustrated in FIG. 7C. For instance, a user may provide a reset request through the GUI 705 of the plugin and the plugin 255 may determine the network location information of the live service (e.g., stored by the plugin prior to overwriting it with the address of the virtual service's host's network location), locate the network reference in the reference file 262 and re-write the address information for the network location of the live service to again cause outbound requests intended for the live service (or application) to be directed to the live service (i.e., and not its corresponding virtual service). In addition to ending the virtual session, the key request response transactional data that is captured can be automatically (or explicitly) saved so that the virtual service model can be created anytime in the future with this data, without requiring any additional recordings. Such cases are anticipated for creating "gold" test cases that can be used for regression testing a predetermined (and pre-recorded) behavior from changes that are made to the underlying computer system, among other example uses.

Figure 8A:
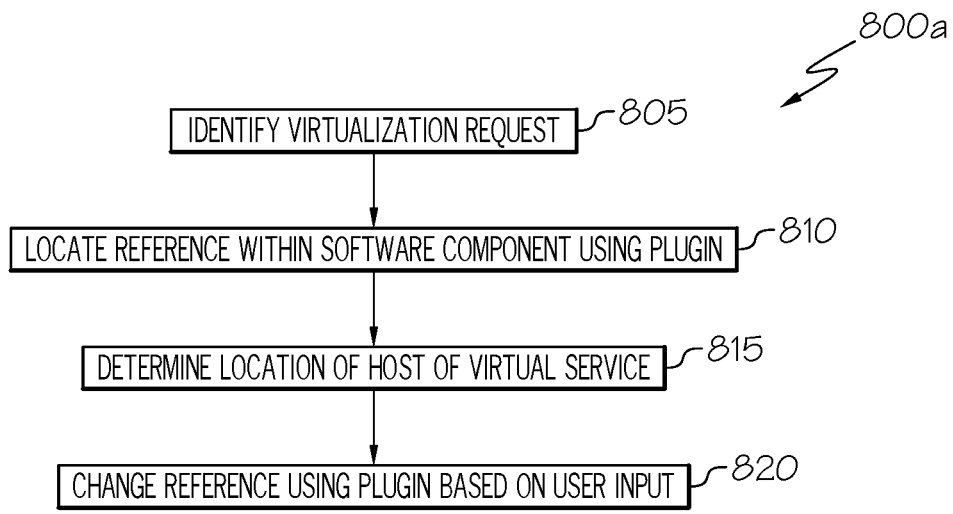
FIGS. 8A-8B are simplified flowcharts illustrating example techniques associated with launching virtual transactions using a plugin associated with a virtualization system in accordance with at least one embodiment.
Figure 8B:
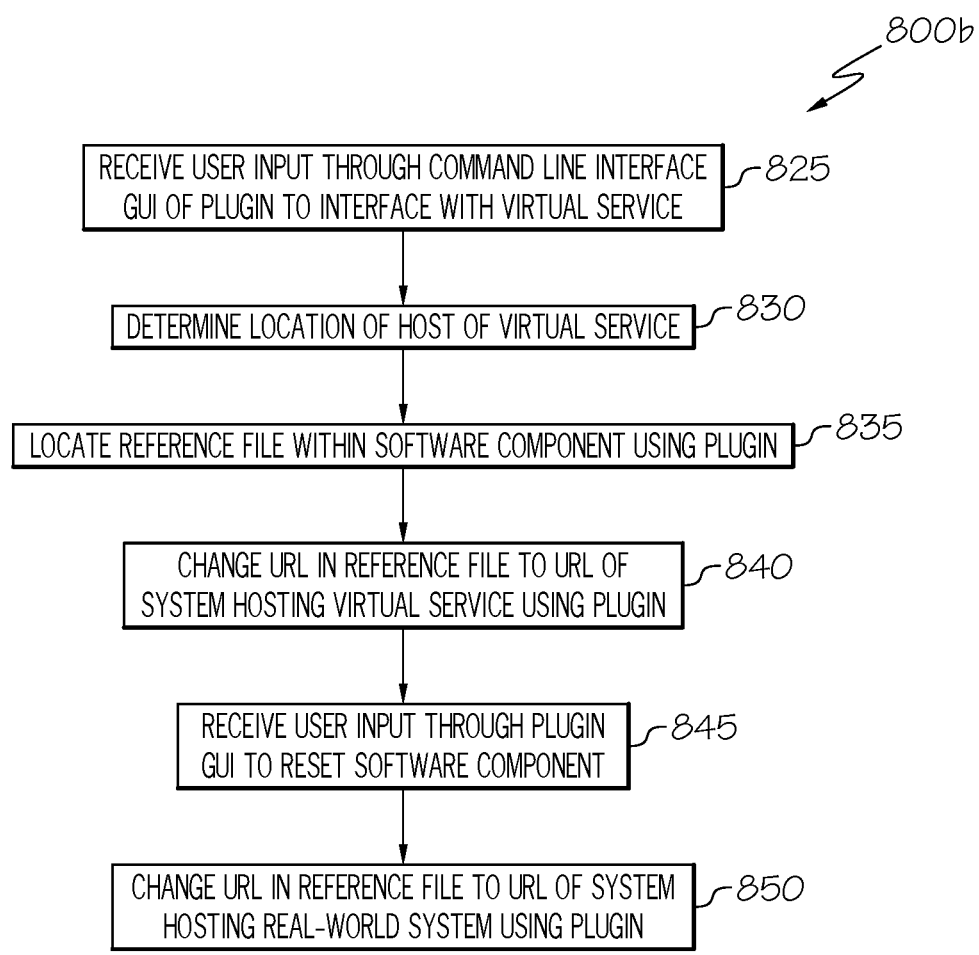

Turning to FIGS. 8A-8B, simplified flowcharts 800*a-b* are presented illustrating example techniques involved in using a plugin in connection with the launching of virtual transactions using one or more virtual services. For instance, as shown in the example of FIG. 8A, a virtualization request may be identified 805 that identifies a particular application to be virtualized. The virtualization request may further identify a virtual service that is to stand-in for the particular application, for instance, by providing a name of the virtual service (or its virtual service mode) or by providing address information to identify the network location whereon the virtual service is (or is to be) hosted. A plugin provide on a software component may locate 810 an outbound reference within the software component, which is used by the software component to direct requests to the particular application. The plugin my further determine 815 the network location of the virtual service (e.g., from address information or a virtual service name provided in the virtualization request) and change the located reference within the software component to refer to the location of the virtual service instead of the particular application modeled by the virtual service.

In a more particular example, shown in FIG. 8B, a user input may be received 825 through a command line interface of an example GUI of a plugin added to a particular software component. In this particular example, the particular software component may be a particular type of ESB. The plugin may be specifically adapted to locate and change outbound reference addresses of remote services with which the ESB is to be communicate (e.g., to facilitate communication between the remote services and client applications connected to the ESB. The user input may be a request to virtualize a particular one of the remote services and may include address information corresponding to a system hosting a virtual service constructed to simulate the particular remote service. In response to the user input, the plugin may determine 830 an address of the system that is or is to host the virtual service and automatically locates 835 the location in the particular software component where the outbound address reference of the particular service is maintained, such as in a particular reference file that is specific to the type and design of the particular software component. The plugin may then change 840 a URL (or other address information used in the outbound reference) to reference the host of the virtual service instead of the particular remote service (i.e., modeled by the virtual service). This may cause subsequent transactions intended for the particular remote service to be instead redirected to the virtual service. When a virtualization is to be closed, the plugin may be further used to receive 845 a user input directing the plugin to automatically reset the address information to cause the plugin to change 850 the URL reference back to the original URL (of the remote service) to cause outbound requests of the particular software component to again be sent to the particular remote service instead of the virtual service.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
 identifying a virtualization request to initiate a virtualized transaction involving a first software component and a virtual service simulating a second software component;
 determining a location of a reference, within the first software component, to the second software component based on a type of the first software component, wherein the location of the reference comprises a particular file associated with the first software component, and the first software component is to use the location of the reference to determine a first network location of the second software component and communicate with the second software component based on the first network location;
 determining a second network location of a system to host the virtual service; and
 changing the reference within the particular file, using a plug-in installed on the first software component, to direct communications of the first software component to the second network location instead of the first network location responsive to the virtualization request, wherein the virtualized transaction is to comprise a request sent from the first software component to the virtual service and a synthetic response generated by the virtual service to model a real response by the second software component to the request.

2. The method of claim 1, wherein the virtualization request is received through a standardized user interface, and the standardized user interface is associated with the plug-in.

3. The method of claim 2, the plugin is one of a plurality of plug-ins, each of the plurality of plug-ins is adapted for use in a respective one of a plurality of software components, and each of the plurality of plug-ins is associated with a virtualization platform to provide the virtual service.

4. The method of claim 3, wherein each of the plurality of plug-ins comprises the standardized user interface.

5. The method of claim 4, wherein the standardized user interface comprises a command line interface.

6. The method of claim 2, further comprising receiving a recording request, through the standardized user interface, wherein the recording request causes a plurality of requests by the first software component to the second software component and a plurality of responses by the second software component to the plurality of requests to be recorded, and the virtual service is based on the recorded requests and responses.

7. The method of claim 6, further comprising identifying a location of a virtual service model generated from the recorded requests and responses, wherein the virtual service uses the virtual service model to generate the synthetic response.

8. The method of claim 7, wherein the virtualization request comprises a name of the virtual service and the method further comprises:
 retrieving the virtual service model based on the name of the virtual service; and
 launching the virtual service at the system.

9. The method of claim 1, wherein the virtualization request comprises identification of the second network location.

10. The method of claim 1, wherein the first software component the type comprises a particular type, the particular file is of a particular format, and the reference is to be included in the file of the particular format in software components of the particular type.

11. The method of claim 10, wherein the first software component comprises an Enterprise Service Bus (ESB).

12. The method of claim 10, wherein changing the reference comprises overwriting the reference to first network location in the particular file with a reference to the second network location.

13. The method of claim 12, further comprising:
receiving a reset request at the plug-in following the virtualized transaction;
resetting the reference, using the plug-in, to direct communications of the first software component back to the first network location based on the reset request.

14. A non-transitory computer readable medium having program instructions stored therein, wherein the program instructions are executable by a computer system to perform operations comprising:
identifying a virtualization request to initiate a virtualized transaction involving a first software component and a virtual service simulating a second software component;
determining a location of a reference, within the first software component, to the second software component based on a type of the first software component, wherein the location of the reference comprises a particular file associated with the first software component, and the first software component is to use the location of the reference to determine a first network location of the second software component and communicate with the second software component based on the first network location;
determining a second network location of a system to host the virtual service; and
changing the reference within the particular file, using a plug-in installed on the first software component, to direct communications of the first software component to the second network location instead of the first network location responsive to the virtualization request, wherein the virtualized transaction is to comprise a request sent from the first software component to the virtual service and a synthetic response generated by the virtual service to model a real response by the second software component to the request.

15. A system comprising:
at least one data processing apparatus;
at least one memory element;
a first software component comprising:
a plug-in embedded in code of the first software component, the plug-in executable by the data processing apparatus to:
receive a virtualization request to initiate a virtualized transaction involving the first software component and a virtual service simulating a second software component;
determine a reference within the first software component to the second software component, wherein the first software component is to use the reference to determine a first network location of the second software component;
determine a second network location of a host system to host the virtual service;
change the reference to re-direct communications intended for the second software component from the first software component to the second network location based on the virtualization request, wherein the virtualized transaction is to comprise a request sent from the first software component to the virtual service and a synthetic response generated by the virtual service to simulate a real response by the second software component to the request; and
a virtualization system, executable by the data processing apparatus to:
generate a virtual service model from recorded transactions involving the first software component and second software component; and
implement the virtual service on the host system using the virtual service model.

16. The system of claim 15, wherein the plug-in comprises a first plugin is associated with the virtualization system and the system further comprises a third software component comprising a second plugin associated with the virtualization system, wherein the third software component is a type different from the first software component, the second plugin is to identify a virtualization request involving the third software component and change a reference within the third software component to redirect requests of the third software component to another system hosting another virtual service provided by the virtualization system.

17. The system of claim 16, wherein the first software component comprises a first Enterprise Service Bus (ESB) and the third software component comprises a second ESB, the first ESB comprises a first file of a first type comprising the reference within the first software component, the second ESB comprises a second file of a different, second type comprising the reference within the second software component, the first plugin is adapted to identify that the reference in the first software component within the first file, and the second plugin is adapted to identify that the reference in the third software component within the second file.

18. The system of claim 16, wherein the first and second plugins each provide an instance of a standardized user interface to receive virtualization requests.

19. The system of claim 15, further comprising a testing system to monitor the virtualized transaction and generate test results from the monitoring of the virtualized transaction.

* * * * *